United States Patent
Yamada et al.

(10) Patent No.: US 6,986,029 B2
(45) Date of Patent: *Jan. 10, 2006

(54) MICRO-CONTROLLER FOR READING OUT COMPRESSED INSTRUCTION CODE AND PROGRAM MEMORY FOR COMPRESSING INSTRUCTION CODE AND STORING THEREIN

(75) Inventors: Hiromichi Yamada, Hitachi (JP); Dai Fujii, Tokai (JP); Yasuhiro Nakatsuka, Tokai (JP); Takashi Hotta, Hitachi (JP); Kotaro Shimamura, Hitachinaka (JP); Tatsuki Inuduka, Mito (JP); Takanaga Yamazaki, Tama (JP)

(73) Assignee: Hitachi, Ltd., Tokyo (JP)

( * ) Notice: Subject to any disclaimer, the term of this patent is extended or adjusted under 35 U.S.C. 154(b) by 453 days.

This patent is subject to a terminal disclaimer.

(21) Appl. No.: 10/201,249

(22) Filed: Jul. 24, 2002

(65) Prior Publication Data

US 2003/0033482 A1 Feb. 13, 2003

Related U.S. Application Data

(63) Continuation of application No. 10/101,480, filed on Mar. 20, 2002, now Pat. No. 6,915,413.

(30) Foreign Application Priority Data

Aug. 7, 2001 (JP) ............................. 2001-239442

(51) Int. Cl.
*G06F 7/06* (2006.01)
*G06F 15/76* (2006.01)
(52) U.S. Cl. .................. 712/300; 712/245; 712/27
(58) Field of Classification Search ................ 712/210, 712/213, 224, 225, 300, 27, 245; 710/68; 707/102; 382/233; 704/10
See application file for complete search history.

(56) References Cited

U.S. PATENT DOCUMENTS

| | | | | |
|---|---|---|---|---|
| 5,587,801 A | * | 12/1996 | Kamei et al. | ................ 358/296 |
| 5,737,733 A | * | 4/1998 | Eller | .............................. 707/3 |
| 6,151,618 A | * | 11/2000 | Wahbe et al. | .................. 718/1 |
| 6,691,305 B1 | * | 2/2004 | Henkel et al. | .............. 717/136 |

OTHER PUBLICATIONS

*MicroNews*, First Quarter 1999, vol. 5, No. 1, entitled CodePack Code Compression from PowerPC Processors by Mark Game et al.
*MPC565 / MPC566 Reference Manual (Motorola)*, Oct. 15, 2000, entitled "Section 4 Burst Buffer Controller Module".
*ARM*, Version 2.0, Mar. 1995, entitled "An Itroduction to Thumb".

* cited by examiner

*Primary Examiner*—Daniel H. Pan
(74) *Attorney, Agent, or Firm*—Crowell & Moring LLP

(57) ABSTRACT

A micro-controller includes a dictionary memory for storing instruction codes which appear in a program, and a compressed code memory for storing compressed codes each converted from each of the instruction codes included in the program. Each compressed code has a word length sufficiently long to identify all instruction codes included in the program. Each compressed code has a value indicative of an address in the dictionary memory at which an associated instruction code is stored. The micro-controller is responsive to an instruction code read request which specifies an address of a compressed code to read the compressed code stored in the specified address in the compressed code memory, and to subsequently read an instruction code stored in an address indicated by the compressed code in the dictionary memory.

8 Claims, 16 Drawing Sheets

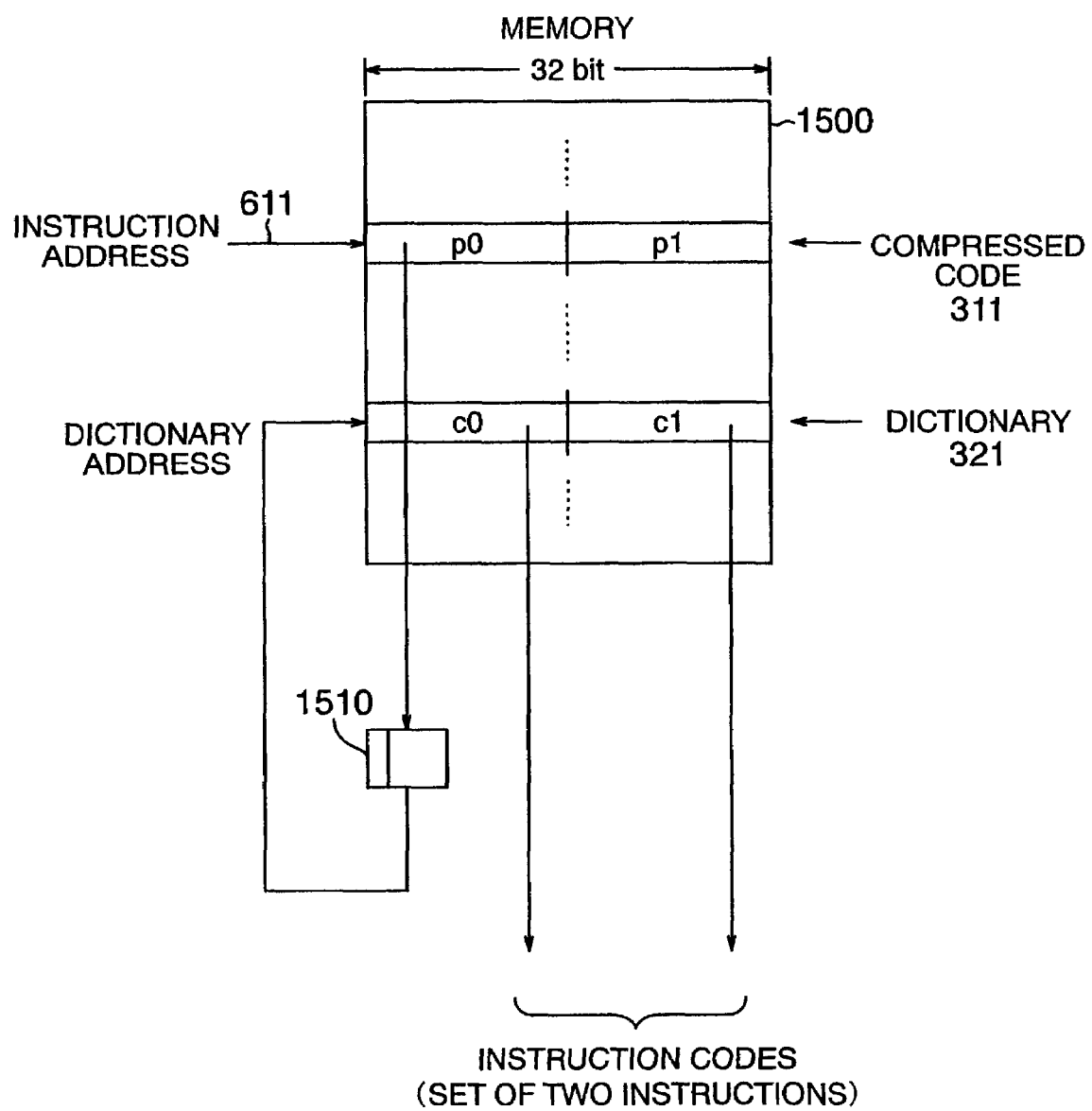

MICRO-CONTROLLER FOR READING OUT COMPRESSED INSTRUCTION CODE AND PROGRAM MEMORY FOR COMPRESSING INSTRUCTION CODE AND STORING THEREIN

This is a continuation of application Ser. No. 10/101,480, filed Mar. 20, 2002, now U.S. Pat. No. 6,915,413.

BACKGROUND OF THE INVENTION

1. Field of the Invention

The present invention relates to a microcontroller, and more particularly, to a micro-controller which compresses instruction codes and stores the compressed instruction codes in a program memory.

2. Description of the Related Art

A micro-controller is a device which is incorporated in an electric device such as electric appliances, audio-visual (AV) devices, portable telephones, cars and the like to control the device associated therewith by executing processes in accordance with programs stored in a built-in read only program memory (ROM).

The micro-controller is required to provide performance necessary to control an associated device and to be inexpensive, from the nature of the micro-controller that is incorporated in a device for utilization.

In recent years, however, processes executed by the micro-controller have become increasingly complicated, with an increased capacity of a program memory required for the processes. For this reason, the program memory accounts for an increasingly higher proportion in the micro-controller, and this trend is thought to remain unchanged in the future. Generally, since an increased capacity of the program memory results in a correspondingly higher cost, it is a critical problem to limit the capacity of the program memory for providing an inexpensive micro-controller.

For general-purpose information processing apparatuses such as personal computers, workstations and the like, techniques for compressing instruction codes have been proposed and brought into practical use for reducing the capacity of program memories.

The compression techniques proposed for general-purpose information processing apparatuses, however, are not always suitable for applications in built-in devices such as a micro-controller without modification because these techniques are implemented, for example, on the assumption that a cache has a relatively high hit rate, for purposes of improving the throughput of instructions, and the like. Specifically, built-in devices such as a micro-controller generally present cache hit rates not so high, and require a high responsibility to interrupts. Also, the built-in devices often regard the latency more important than the throughput of instructions. Further, the built-in devices are characterized by a high proportion of instruction codes (instruction codes in a narrow sense excluding read data) included in programs. Therefore, what is important for the built-in devices is to expand compressed codes to instruction codes faster than general-purpose information processing apparatuses.

SUMMARY OF THE INVENTION

It is an object of the present invention to provide instruction code compressing technique which offers a high compression ratio and a fast instruction expendability.

To achieve the above object, the present invention provides a micro-controller for performing a process in accordance with a program, which includes a dictionary memory for storing instruction codes which appear in the program, and a compressed code memory for storing compressed codes each converted from each of the instruction codes included in the program, wherein each compressed code has a word length sufficiently long to identify all instruction codes included in the program, and has a value indicative of an address in the dictionary memory at which an associated instruction code is stored.

The micro-controller is responsive to an instruction code read request which specifies an address of a compressed code to read the compressed code stored in the specified address in the compressed code memory, and to subsequently read an instruction code stored in an address indicated by the compressed code in the dictionary memory.

Each of instruction codes appearing in a program is converted to a compressed code having a number of bits required for identification. The dictionary memory for use in expanding the compressed code to an original instruction code is stored in a program memory. The compressed code is configured to indicate an address in the dictionary, thereby achieving the compression of instruction codes which offers a high compression ratio and fast instruction expandability.

Other objects, features and advantages of the invention will become apparent from the following description of the embodiments of the invention taken in conjunction with the accompanying drawings.

BRIEF DESCRIPTION OF THE DRAWINGS

FIG. 15 is a block diagram for explaining an exemplary configuration of a program memory in a thirteenth embodiment.

DESCRIPTION OF THE EMBODIMENTS

A variety of embodiments of the present invention will be described below with reference to the accompanying drawings.

Figure 1:
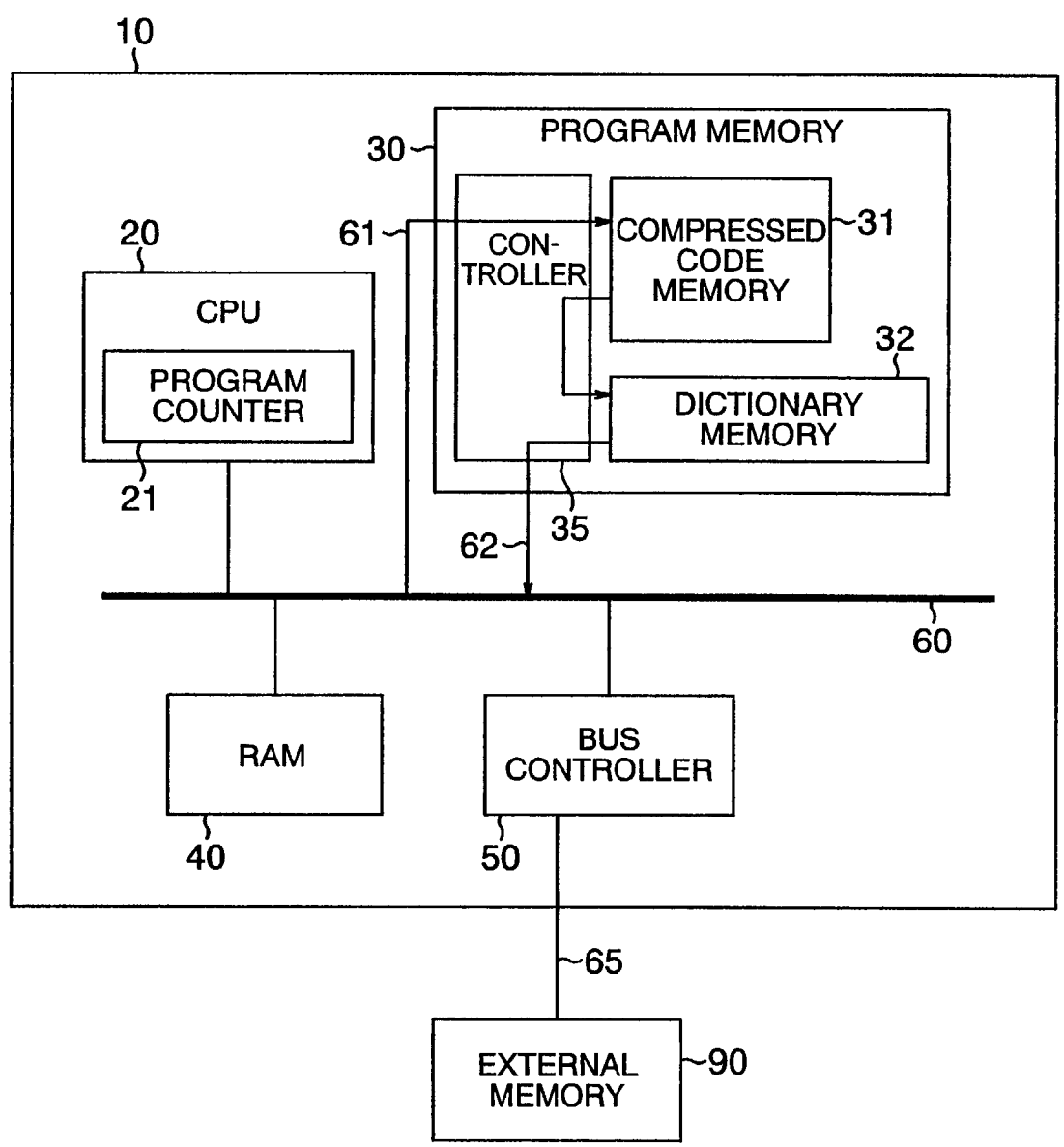
FIG. 1 is a block diagram for explaining a main portion in the configuration of one embodiment of a micro-controller according to the present invention.

FIG. 1 is a block diagram for explaining the configuration of a main portion in one embodiment of a micro-controller to which the present invention is applied.

In FIG. 1, the micro-controller 10 comprises a CPU 20 for executing a program; a program memory 30 for storing programs, a RAM 40 for temporarily storing a program, data and the like; a bus controller 50 for controlling an external bus 65 and the like; and a CPU bus 60 for interconnecting these components.

The CPU 20 is provided therein with a program counter 21 for controlling an order in which instructions in a program are executed. The program counter 21 indicates an address in the program memory 30 which stores an instruction code to be next executed.

The bus controller 50 is connected to an external memory 90 and the like, for example, through the external bus 65. The bus controller 50 is also connected to a group of devices required for a particular application of the micro-controller, for example, a peripheral module for controlling an input device, a display device and the like, a DMA device, and the like through a peripheral module bus or the like.

The program memory 30 includes a compressed code memory 31; a dictionary memory 32; and a controller 35 for controlling a read from the program memory 30. The controller 35 may be provided independently, for example, outside the program memory 30, or provided within the bus controller 50. Also, the compressed code memory 31 and dictionary memory 32 are preferably configured as separate memories such that they can be simultaneously read.

Figure 2A:
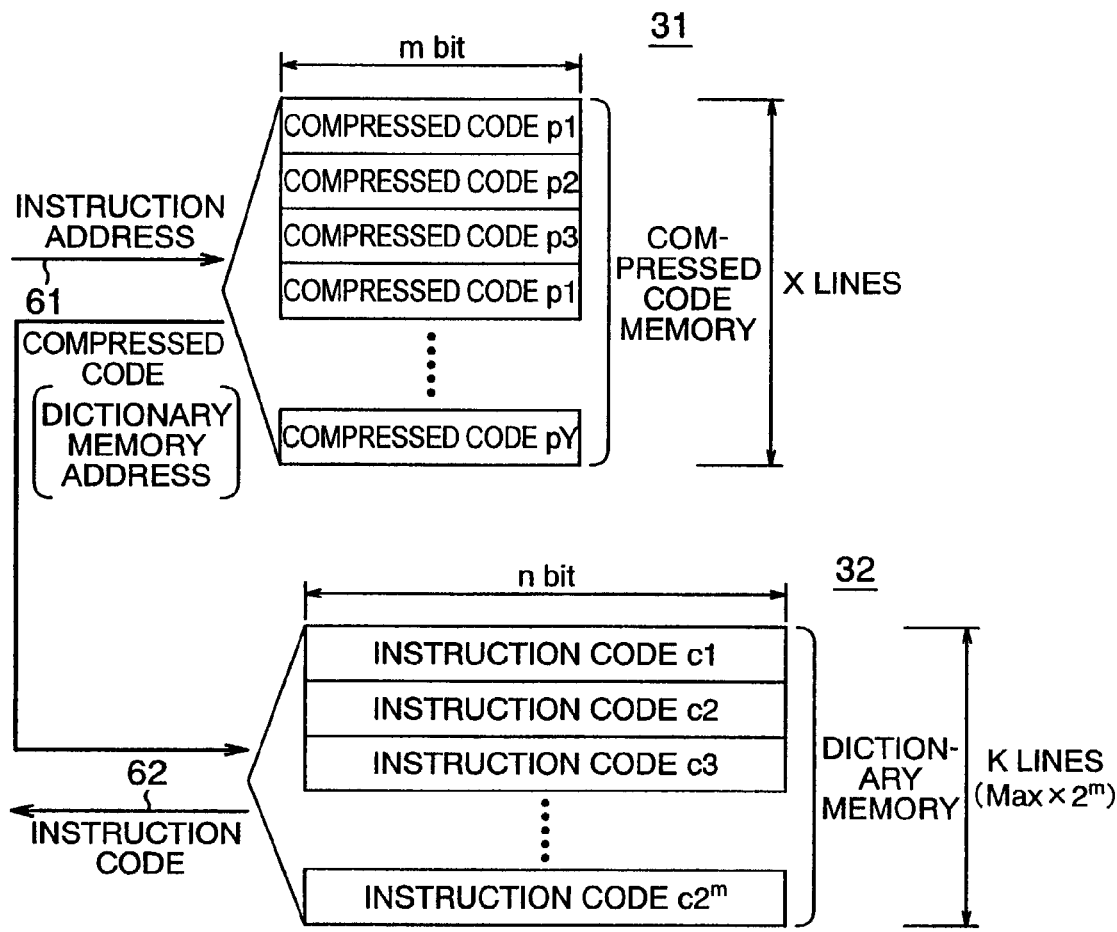
FIG. 2A is a schematic diagram for explaining a relationship between a compressed code memory and a dictionary memory provided in a program memory in a first embodiment which shows basic principles of the present invention.

FIG. 2A is a schematic diagram for explaining a relationship between the compressed code memory 31 and dictionary memory 32 provided in the program memory 30 in a first embodiment of the present invention for showing basic principles of the present invention.

Now, the compressed code memory 31 and dictionary memory 32 shown in FIG. 2A will be explained with reference to a schematic diagram for explaining a conventional program memory, shown in FIG. 2B, which does not employ compressed codes.

In this embodiment, a compressed code is converted from an instruction code (including a data portion) appearing in a program to a compressed code which has a shorter code length than the original code length. All instruction codes appearing in a program are to be compressed. Therefore, a compression ratio can be improved. Original instruction codes are stored in the dictionary memory 32 for expanding compressed codes.

Figure 2B:
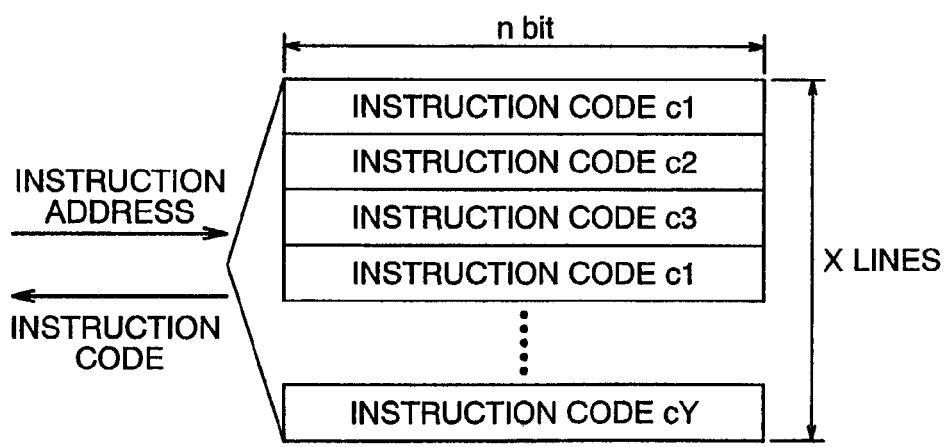
FIG. 2B is a schematic diagram for explaining a conventional program memory which does not use compressed codes.

Assuming, for example, that a program includes X lines of original instruction codes each having a word length of n bits, as shown in FIG. 2B. Assume also that in this event, the number of types K of instruction codes appearing in the program is in a range of $2^{m-1}$ to $2^m$. Generally, since the same instruction code often appears a plurality of times in a program, the number of types K of instruction codes is smaller than X.

In this event, m bits are sufficient for identifying an instruction code on each line of the program. Therefore, a sequence of instruction codes each having n bits on X lines (n bits×X lines) can be converted to a sequence of compressed codes each having m bits on X lines (m bits×X lines). Then, a dictionary having a capacity of n bits×K ($K \leq 2^m$) may be provided for expanding compressed codes to original instruction codes.

Assume further in this embodiment that an m-bit compressed code is corresponded to a code indicative of the address of an instruction code which should be referenced in the dictionary memory. In this manner, an address in the dictionary memory can be directly found from an associated compressed code, so that a shorter time is required for expanding the compressed code to an original instruction code without the need for a complicated address conversion and the like.

Specifically, in the embodiment shown in FIG. 2A, as an instruction address 61 is inputted to the program memory 30 in accordance with the program counter 21, a compressed code (dictionary memory address) is first read, and subsequently, an instruction code 62 stored at this dictionary memory address is read. The program memory 30 is controlled by the control unit 35 for reading the compressed code and instruction code stored therein.

As is apparent from the foregoing explanation, the effect of code compression in this embodiment depends on the type of instruction code which appears in a program.

Consider, for example, that a 1 Mbyte program includes 256K lines of instruction codes each having a 32-bit length. Assuming that 64K ($=2^{16}$) types of instruction codes, which are equivalent to one quarter of the whole number of instruction codes, appear in the program, the instruction codes can be compressed to compressed codes having a 16-bit length.

In this event, the compressed code memory 31 requires the capacity of 512 Kbytes (16 bits×256 K). Then, the dictionary memory 32 requires the capacity of 256 Kbytes (32 bits×62 K). As a result, a total capacity of the compressed code memory 31 and dictionary memory 32 amount to 768 Kbytes which is a reduction to 75% of 1 Mbyte which would be required when the instruction codes are not compressed.

Assuming in another case that 32 K ($=2^{15}$) types of instruction codes, which are equivalent to one eighth of the whole number of instruction codes, appear in a program, a total capacity of the compressed code memory 31 and dictionary memory 32 amount to 600 Kbytes which is a reduction to 59% of 1 Mbyte which would be required when the instruction codes are not compressed.

On the other hand, assuming that a 1 Mbyte program includes 256K ($=2^{18}$) lines of instruction codes each having a 32-bit length, all of which are different from one another, the instruction codes are compressed to compressed code having a 18-bit length.

In this event, the compressed code memory 31 requires the capacity of 576 Kbytes (18 bits×256 K), while the dictionary memory 32 requires the capacity of 1 Mbyte (32 bits×256 K). As a result, a total capacity of the compressed code memory 31 and dictionary memory 32 amount to 1.6 Mbits which is 1.6 times larger than 1 Mbyte that is required when the instruction codes are not compressed.

Since an actual program has the nature of repeatedly using the same instruction codes a plurality of times, types of appearing instruction codes are in most cases reduced to approximately one fifth of the number of instruction codes. It is desired however that the program memory 30 can support even if the types of instruction codes cannot be limited within a range in which the memory capacity can be effectively reduced.

For the reason set forth above, in a second embodiment, the program memory 30 can be selectively utilized as the compressed code memory 31 and dictionary memory 32 as shown in FIG. 2A, and as a program memory for storing instruction codes in a conventional format as shown in FIG. 2B. The second embodiment will be explained below with reference to FIG. 3.

Figure 3:
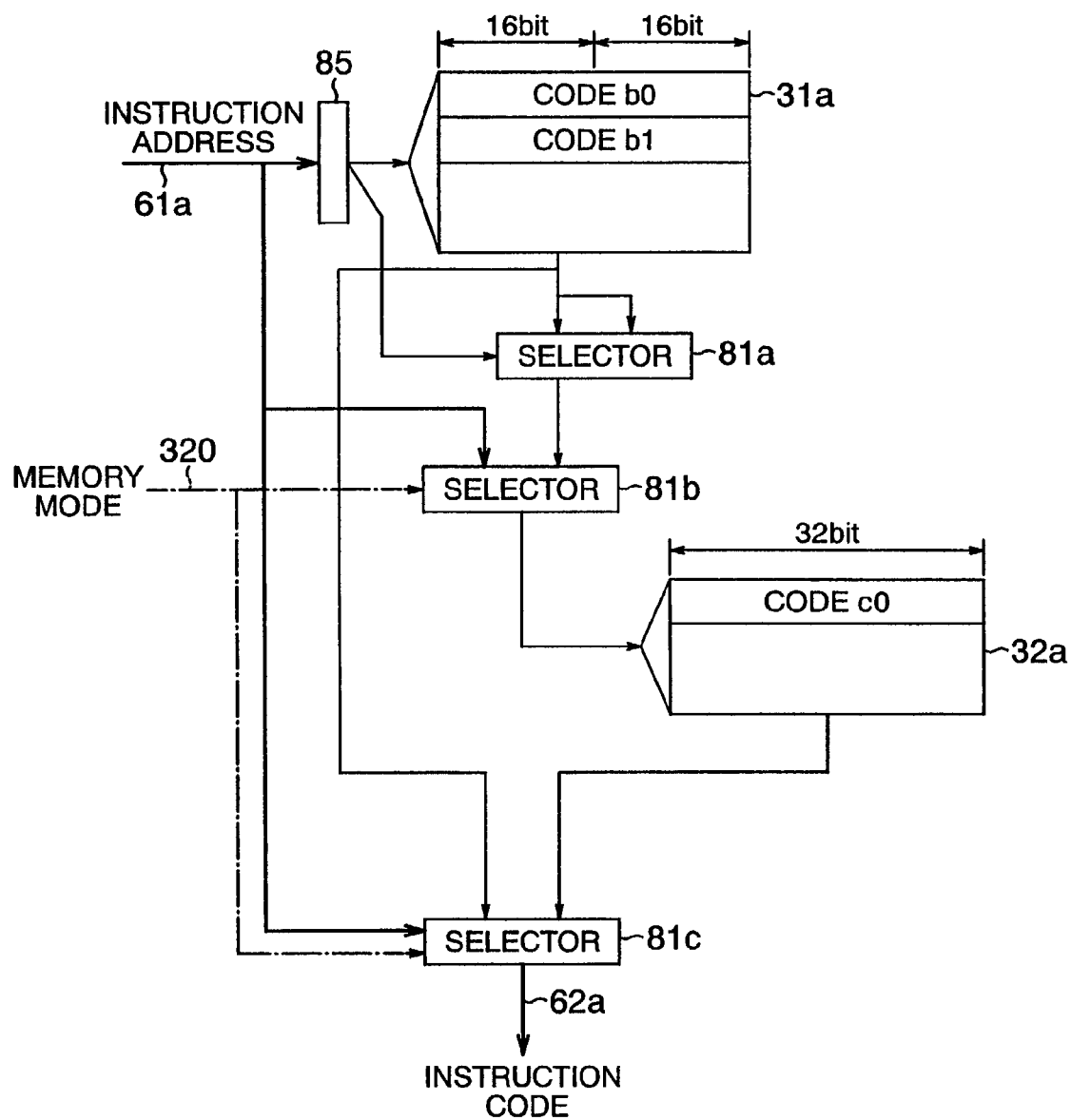
FIG. 3 is a block diagram for explaining an exemplary configuration of a program memory in a second embodiment.

FIG. 3 is a schematic diagram for explaining an exemplary configuration of the program memory 30 in the second embodiment. Here, the explanation will be given of a 32-bit instruction code and a 16-bit compressed code, as an example, for simplicity. Of course, the present invention is not limited to these particular code lengths.

In the second embodiment, a compressed code memory 31a can store either instruction codes or compressed codes. The compressed code memory 31a is not scheduled to store a mixture of instruction codes and compressed codes.

The program memory 30 can be switched by a selector 81a, a selector 81b and a selector 81c when it is utilized as a compressed code memory 31a and a dictionary memory 32a and when it is utilized as a program memory for storing instruction codes in a conventional format.

When the program memory 30 is utilized for storing instruction codes in a conventional format, the compressed code memory 31a and dictionary memory 32a are handled as a single continuous memory space for storing 32-bit instruction codes, and a stored instruction code 62a is read from an address indicated by an instruction address 61a.

In this event, since an instruction code has a 32-bit length, the instruction address 61 indicated by the program counter 21 is a multiple of four (0, 4, 8, . . . ). A code b0, a code b1, and a code c0 in the figure are 32-bit instruction codes, respectively.

When the program memory 30 is utilized for storing compressed codes, the compressed code memory 31a stores 16-bit compressed codes, and the dictionary memory 32a stores 32-bit instruction codes for expanding the compressed codes.

In this event, a code b0 and a code b1 in the figure are a combination of two consecutive 16-bit compressed codes. It is therefore necessary to separately read former 16 bits and latter 16 bits when compressed codes are read.

To meet this requirement, a shifter 85 is used in the example illustrated in FIG. 3, for using an instruction address 61a which is shifted one bit to the lower digits. In this event, addresses in the compressed code memory 31a for 4-byte instruction addresses 0, 4, 8, 12 are 0, 2, 4, 6, . . . Since the compressed code memory 31a has a 32-bit width but ignores the two least significant bits of an address, the same 32-bit data of an instruction address is read twice such as 0, 0, 4, 4, . . . Then, the selector 81a uses the second least significant bit of an address outputted from the shifter 85 to select an appropriate compressed code from two compressed codes included in the output from the compressed code memory 31a.

The selector 81b is switched such that the instruction address 61a is inputted to the dictionary memory 32a when the program memory 30 is utilized for storing instruction codes in a conventional format. For storing compressed codes, the selector 81b is switched such that a compressed code outputted from the selector 81a is inputted to the dictionary memory 32a. The selector 81b may be switched, for example, using a memory mode signal 320 indicative of the contents of a register which stores a storage format. The selector 81c is responsive to the instruction address 61a to switch the outputs from the compressed code memory 31a and dictionary memory 32a to deliver an instruction code 62a when the program memory 30 is utilized for storing instruction codes in a conventional format. For storing compressed codes, the output from the dictionary memory 32a is outputted as the instruction code 62a at all times.

By thus configuring the program memory 30, even one and the same micro-controller 10 can support the storage of instruction codes in a conventional format, and the storage of compressed codes by changing programs stored therein. In other words, the micro-controller 10 to which the present invention is applied can be utilized for general purposes.

Next, a third embodiment of the present invention will be described with reference to FIG. 4 which is a block diagram for explaining an exemplary configuration of a program memory 30 in the third embodiment.

In the third embodiment, an original instruction code is divided into an operation field and an operand field which are separately encoded into compressed codes.

Figure 4:
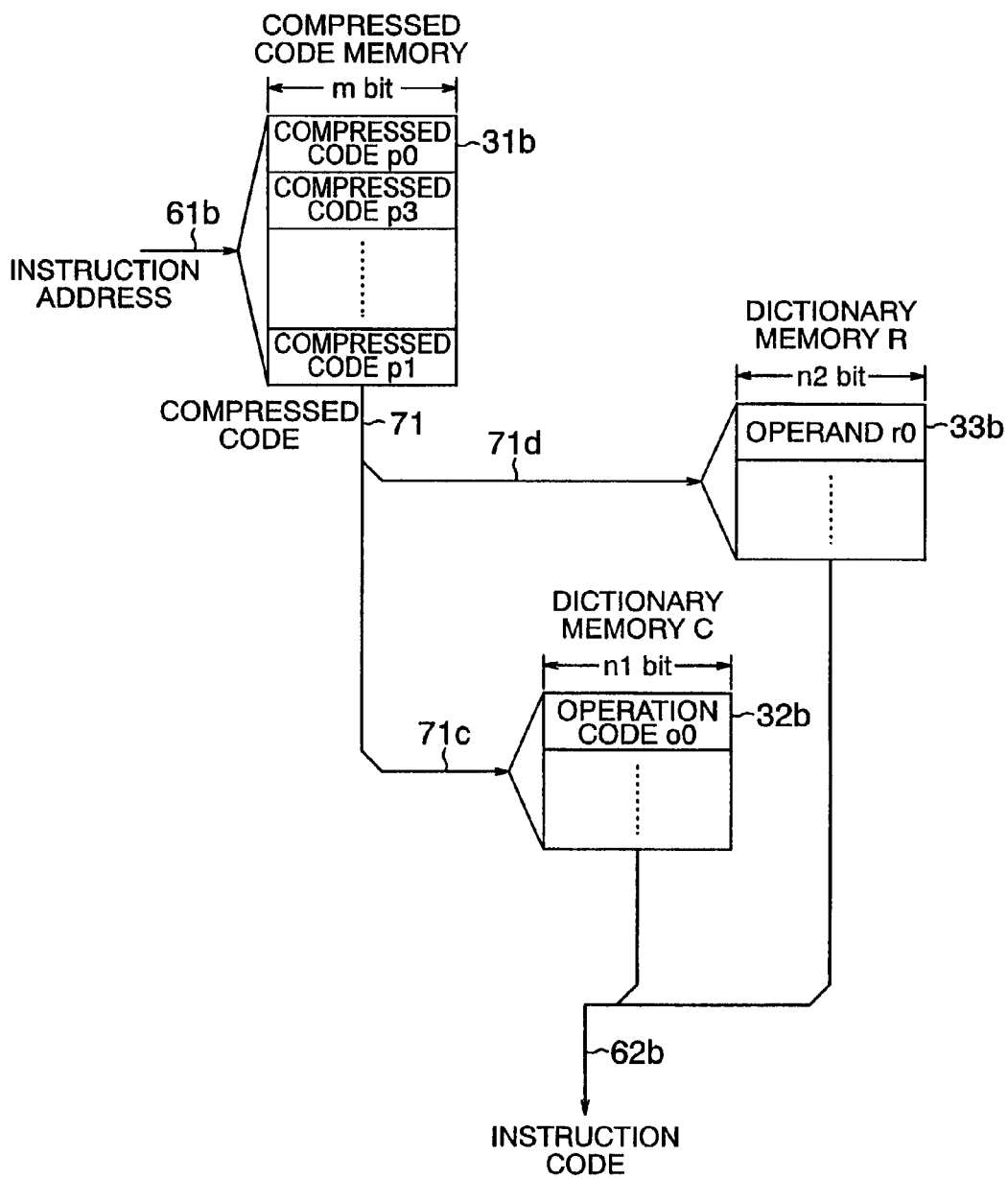
FIG. 4 is a block diagram for explaining an exemplary configuration of a program memory in a third embodiment.

In FIG. 4, a compressed code memory 31b stores m-bit compressed codes. Here, the operation field of an instruction code indicates the type of instruction such as calculation, memory access, branch or the like, and the operand field of the instruction indicates a register number, data or the like.

Similarly, a dictionary memory is also comprised of an operation code dictionary memory C32b for expanding operation codes, and an operand dictionary memory R33b for expanding operands.

A compressed code 71 read from the compressed code memory 31b is separated into an operation code compressed code 71c and an operand compressed code 71d. Then, the operation code dictionary memory C32b is read with an address indicated by the operation code compressed code 71c, and the operand dictionary memory R33b is read with an address indicated by the operand compressed code 71d. Subsequently, the codes read from the two dictionary memories in parallel are combined and outputted as an instruction code 62b.

By doing so, the capacity of the program memory can be further reduced in a program which is characterized by a particular operation code or operand which appears highly frequently. In addition, since the operation code and operand are expanded in parallel, an instruction code can be read faster.

Next, a fourth embodiment of the present invention will be explained with reference to FIG. 5 which is a block diagram for explaining an exemplary configuration of a program memory 30 in the fourth embodiment.

In the fourth embodiment, an original instruction code is divided into an instruction code potion in a narrow sense, and a data portion, each of which is converted to a compressed code independently of each other.

Figure 5:
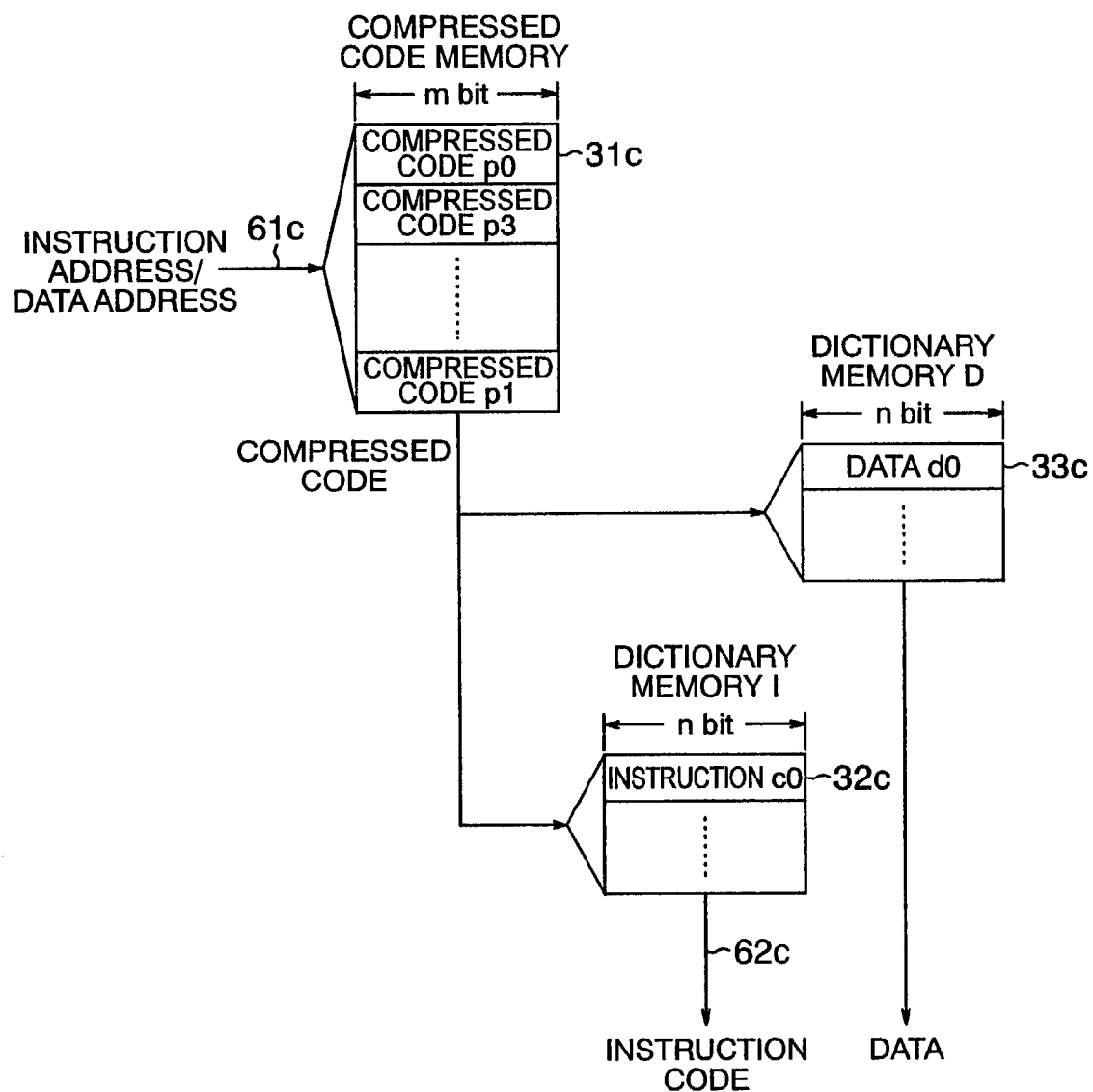
FIG. 5 is a block diagram for explaining an exemplary configuration of a program memory in a fourth embodiment.

In FIG. 5, a compressed code memory 31c stores m-bit compressed codes. A compressed code includes a code indicative of a compressed instruction code, and a code indicative of compressed data. It can be determined whether a read compressed code corresponds to an instruction code or to data, for example, based on a timing at which the compressed code is read, a reading mechanism, and the like.

Specifically, when a code is read at a timing of an instruction fetch stage in an execution cycle of the CPU 20, the read code can be determined to be a compressed instruction code, and when a code is read at a timing of a memory access stage, the read code can be determined to be compressed data.

Then, a compressed code read as an instruction code is expanded with reference to an instruction code dictionary memory I32*c*, while a compressed code read as data is expanded with reference to a data dictionary memory D33*c*.

In the fourth embodiment, since a compressed instruction code and a compressed data code can be distinguished upon reading, an independent coding scheme can be provided for each of them. In other words, the same code can be assigned to a compressed instruction code and to a compressed data code. It is therefore possible to reduce the bit width of compressed codes stored in the compressed code memory 31*c*.

Next, a fifth embodiment of the present invention will be described with reference to FIG. 6 which is a block diagram for explaining an exemplary configuration of a program memory 30 in the fifth embodiment.

In the fifth embodiment, a compressed code is also stored in an external memory 90 in addition to a compressed code memory 31*d*. This may be applied to a program which has too large a capacity to be stored in the program memory 30.

Figure 6:
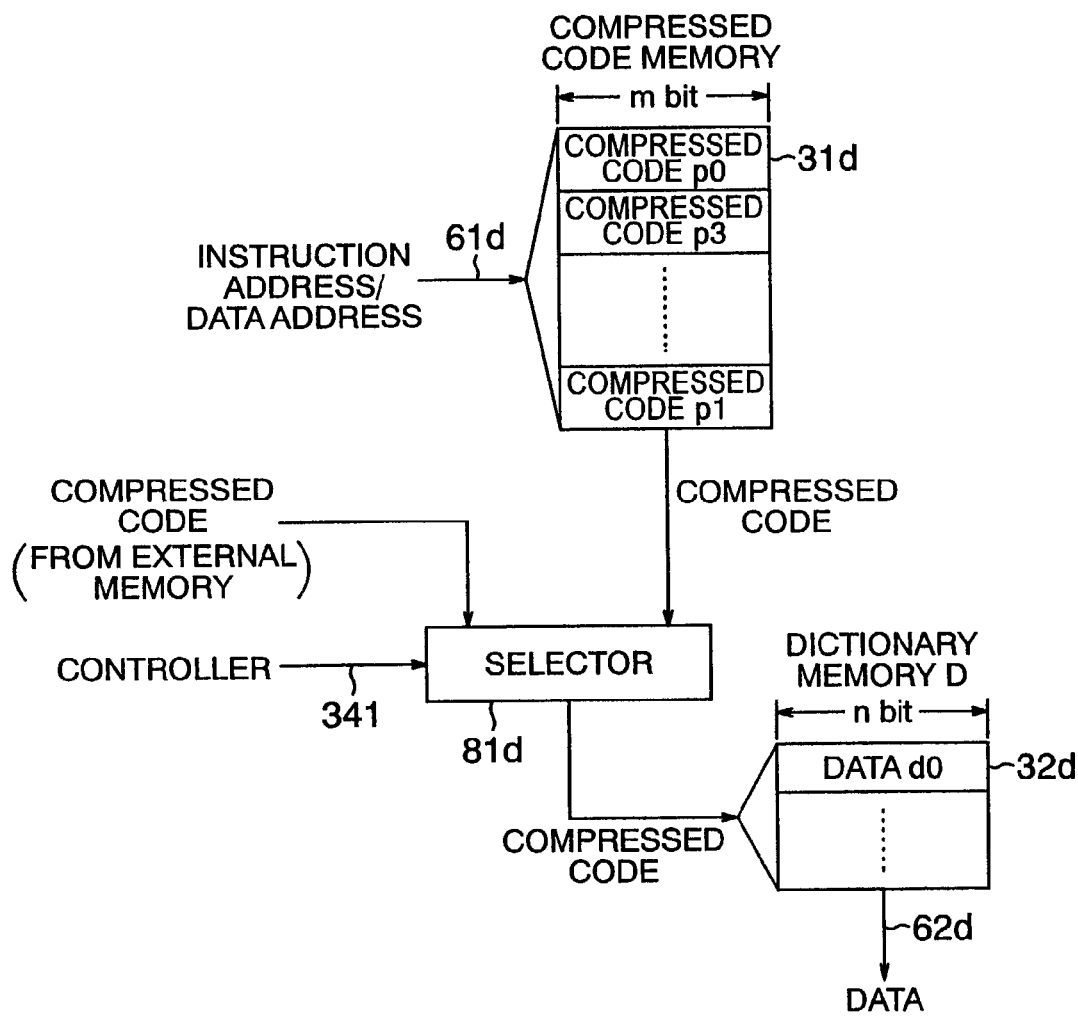
FIG. 6 is a block diagram for explaining an exemplary configuration of a program memory in a fifth embodiment.

In the example illustrated in FIG. 6, a compressed code from the external memory 90 is inputted into the program memory 30 through a bus controller 50. Then, either a compressed code from the compressed code memory 31*d* or the compressed code from the external code 90 is selected by controlling a selector 81*d* by a signal 341 from a controller 35. Then, an instruction code 62*d* is outputted from an address in a dictionary memory 32*d* indicated by the selected compressed code.

Next, a sixth embodiment of the present invention will be described with reference to FIG. 7 which is a block diagram for explaining an exemplary configuration of a program memory 30 in the sixth embodiment.

In the sixth embodiment, a plurality of consecutive instruction codes are collectively converted to a compressed code. For example, a set of three consecutive instructions are converted to a single compressed code which is stored in the fist one of three consecutive codes within a compressed code memory 31*e*. Then, the two subsequent codes (called the "slots") are skipped in execution to reduce power consumption caused by a memory access. An address in the dictionary memory referenced in the slot is generated from the compressed code which has been first stored.

Figure 7:
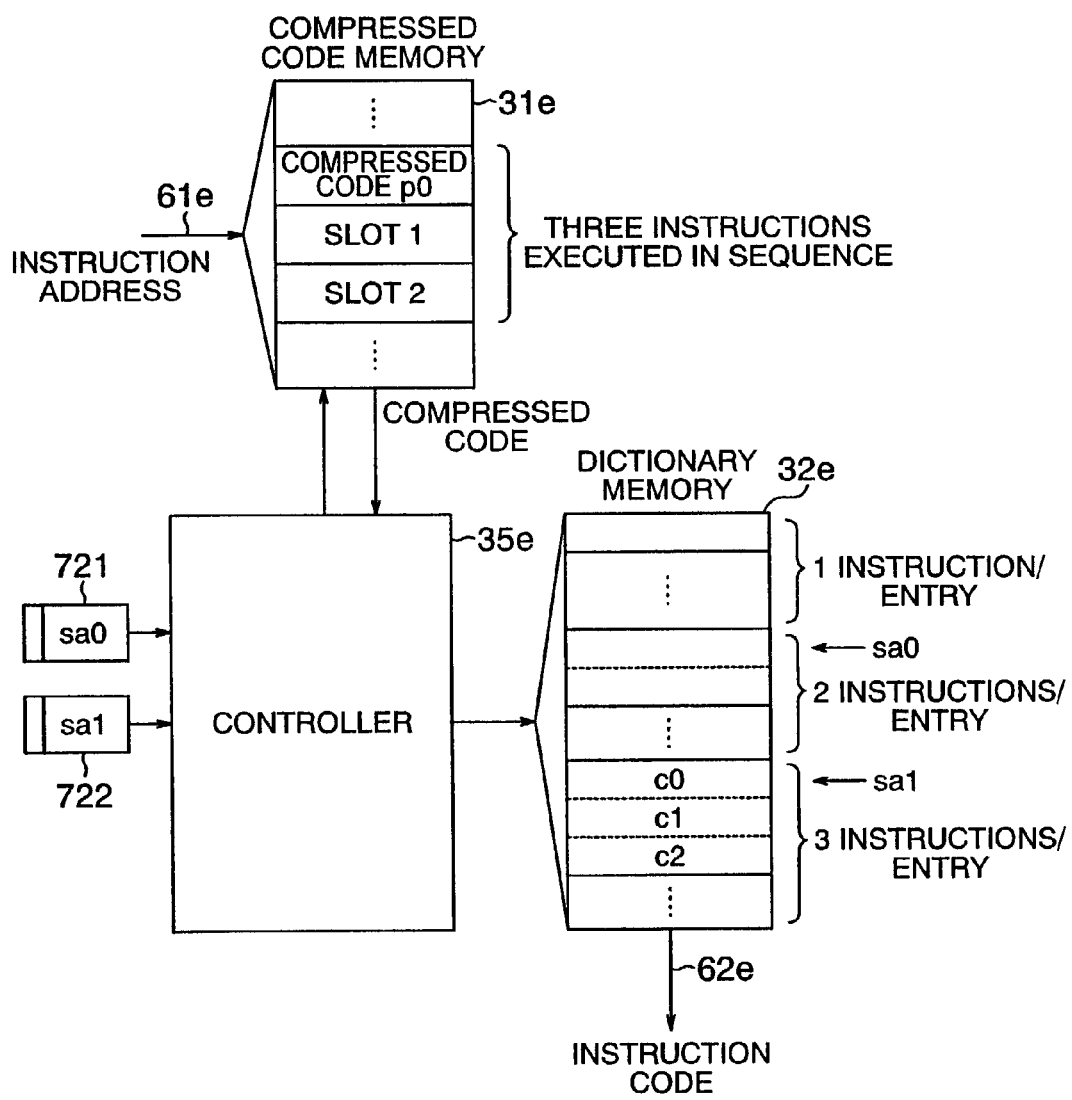
FIG. 7 is a block diagram for explaining an exemplary configuration of a program memory in a sixth embodiment.

For purposes of description, FIG. 7 shows an example in which sets of one instruction, two consecutive instructions, and three consecutive instructions are converted to compressed codes, respectively. Of course, the present invention is not limited to these sets.

In the sixth embodiment, a dictionary memory 32*e* is divided into a one-instruction storage region, a two-instruction storage region, and a three-instruction storage region, each of which stores a dictionary (instruction codes) for sets of consecutive instructions of the number corresponding thereto. Then, an address sa0 indicative of a boundary between the one-instruction storage region and the two-instruction storage region is stored in a register 721, and an address sa1 indicative of a boundary between the two-instruction storage region and the three-instruction storage region is stored in a register 722. In this manner, when the dictionary memory 32*e* is referenced, it can be determined whether the address belongs to the one-instruction storage region or the two-instruction storage region or the three-instruction storage region.

For example, assume that a set of three consecutive instructions c0, c1, c2 are collectively converted to a compressed code p0. In this event, a compressed code memory 31*e* stores codes p0, slot 1, slot 2 in sequence. The slot 1 and slot 2 are dummy data having the same bit length as a compressed code. Then, the instruction c0 is stored in an address indicated by sa1 in the dictionary memory 32*e*, and the instructions c1, c2 are stored in sequence. Here, the address indicated by p0 is included in the three-instruction storage region.

Assuming that the code p0 in the compressed code memory 31*e* is specified by an instruction address 61*e*. A controller 35*e* can determine that p0 is included in the three-instruction storage region by referencing the register 722.

The controller 35*e* first outputs the instruction c0 stored in the address indicated by sa1 in the dictionary memory 32*e* as an instruction code 62*e*. Next, without referencing the compressed code memory 31*e*, the controller 35*e* calculates the address of an instruction code subsequent to the instruction c0 in the dictionary memory 32*e*, and outputs the instruction c1 stored in that address as the instruction code 62*e*. Then, the subsequent c2 is outputted as the instruction code 62*e* in a similar manner. Subsequently, the controller 35*e* reads a compressed code subsequent to the slot 2 in the compressed code memory 31*e*. Of course, if an address indicated by a compressed code belongs to the two-instruction storage region in the dictionary memory 32*e*, the processing for outputting instruction codes is completed when it is executed only once, without accessing the compressed code memory 31*e*.

In this manner, the grouping of instruction codes into a set eliminates the need for reading second and subsequent compressed codes in a plurality of compressed codes which are executed in sequence. Thus, the compressed code memory 31*e* can be accessed a less number of times, thereby reducing power consumption caused by memory accesses.

Alternatively, a compressed code indicative of the address of data referenced in execution of an associated instruction code may be stored in a slot, rather than the dummy data. In this case, the compressed code memory 31*e* can be further effectively utilized.

Figure 8:
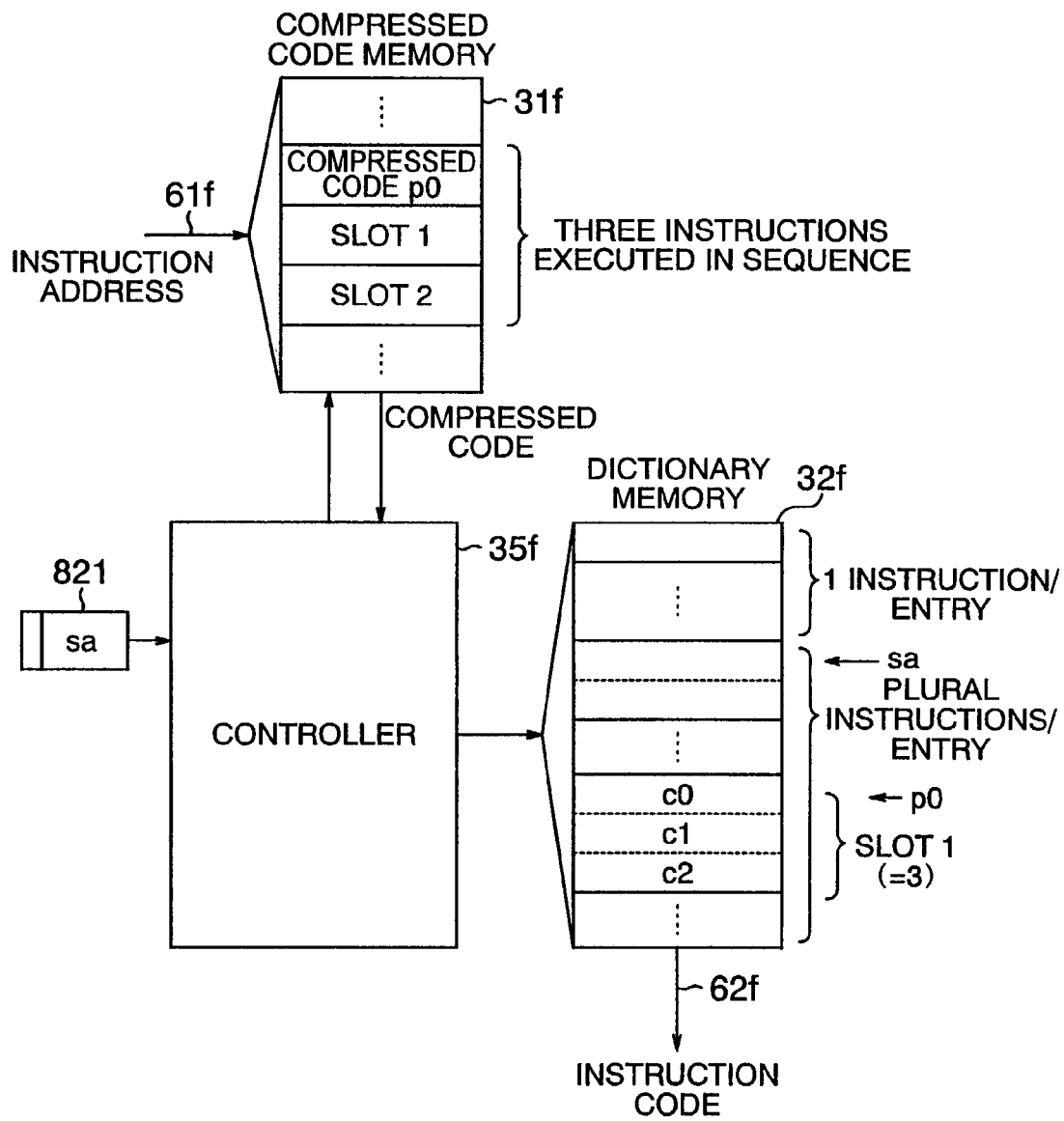
FIG. 8 is a block diagram for explaining an exemplary configuration of a program memory in a seventh embodiment.

Next, a seventh embodiment of the present invention will be described with reference to FIG. 8 which is a block diagram for explaining an exemplary configuration of a program memory 30 in the seventh embodiment.

The seventh embodiment is a modification to the aforementioned sixth embodiment.

In the seventh embodiment, a dictionary memory 32*f* is divided into a one-instruction storage region and a consecutive-instruction storage region. Then, an address sa indicative of a boundary between the one-instruction storage region and the consecutive-instruction storage region is stored in a register 821.

When a compressed code corresponding to consecutive instructions is stored in the compressed code memory 31*f*, the number of consecutive instructions is stored in a slot 1.

Upon reading a compressed code, a controller 35*f* can determines by referencing the register 821 whether the compressed code corresponds to a single instruction or consecutive instructions. Then, when the compressed code corresponds to a single instruction, the controller 35*f* reads an instruction code from the dictionary memory 32*f*, and reads the next compressed code from the compressed code memory 31f. On the other hand, when the compressed code corresponds to consecutive instructions, the controller 35f reads an instruction code from the dictionary memory 32f, and then reads the next slot 1 to acquire the number of consecutive instructions. In accordance with the acquired number of consecutive instructions, the controller 35f reads instruction codes from the dictionary memory 32f without accessing the compressed code memory 31f.

In the seventh embodiment, the power consumption can be reduced because the compressed code memory 31f need not be read for third and subsequent instructions in consecutive instructions. Also, like the sixth embodiment, compressed data codes may be stored in the slot 2 onward.

Figure 9:
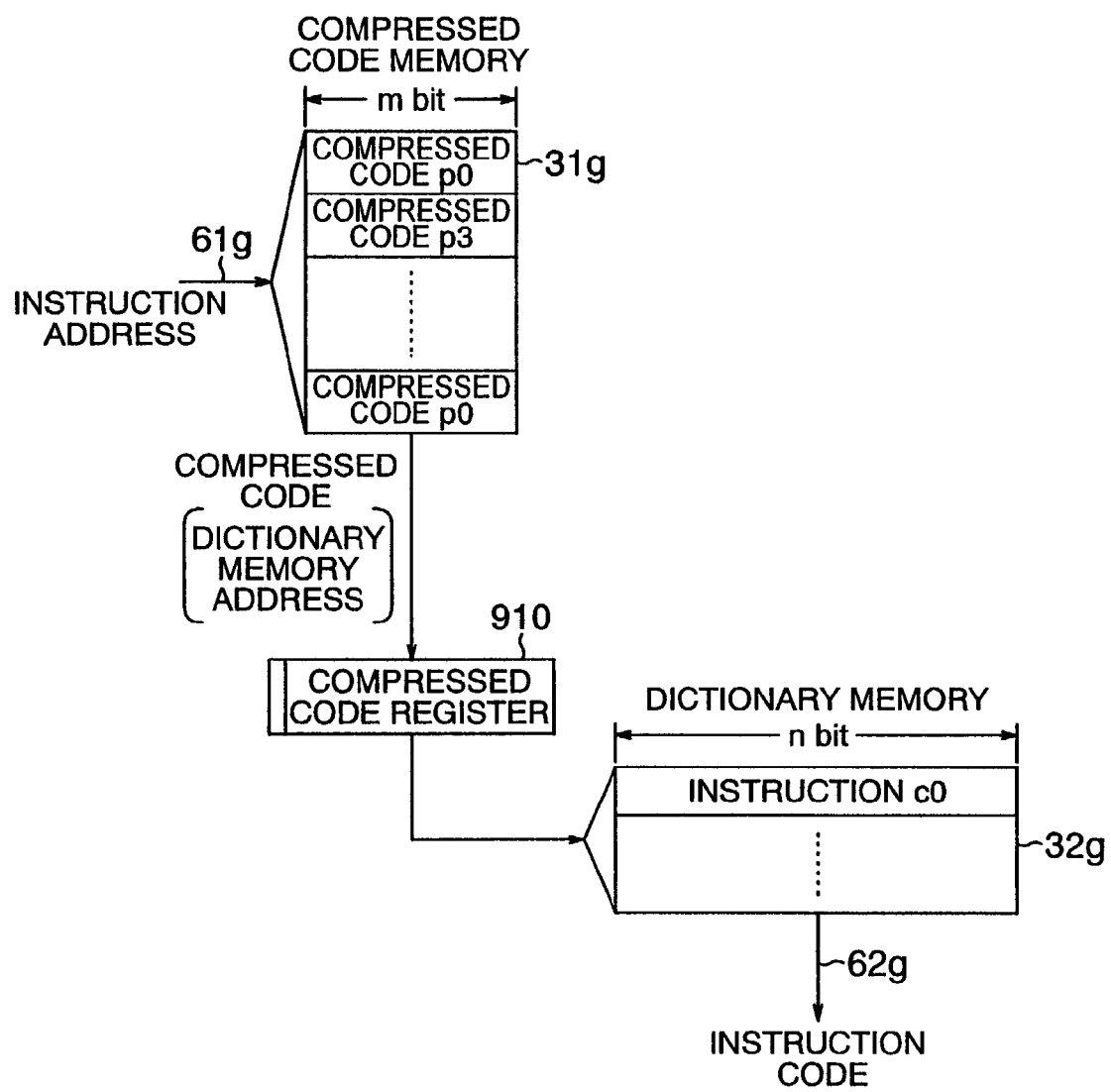
FIG. 9 is a block diagram for explaining an exemplary configuration of a program memory in an eighth embodiment.

Next, an eighth embodiment of the present invention will be described with reference to FIG. 9 which is a block diagram for explaining an exemplary configuration of a program memory 30 in the eighth embodiment.

In the eighth embodiment, a compressed code register 910 is provided between a compressed code memory 31g and a dictionary memory 32g. Compressed codes read from the compressed code memory 31g during one clock is stored in the compressed code register 910.

By doing so, the compressed code reading process and the expansion to an instruction code by the dictionary memory 32g can be divided into two stages in a pipeline, thereby making it possible to readily increase a clock frequency of the micro-controller 10.

Figure 10:
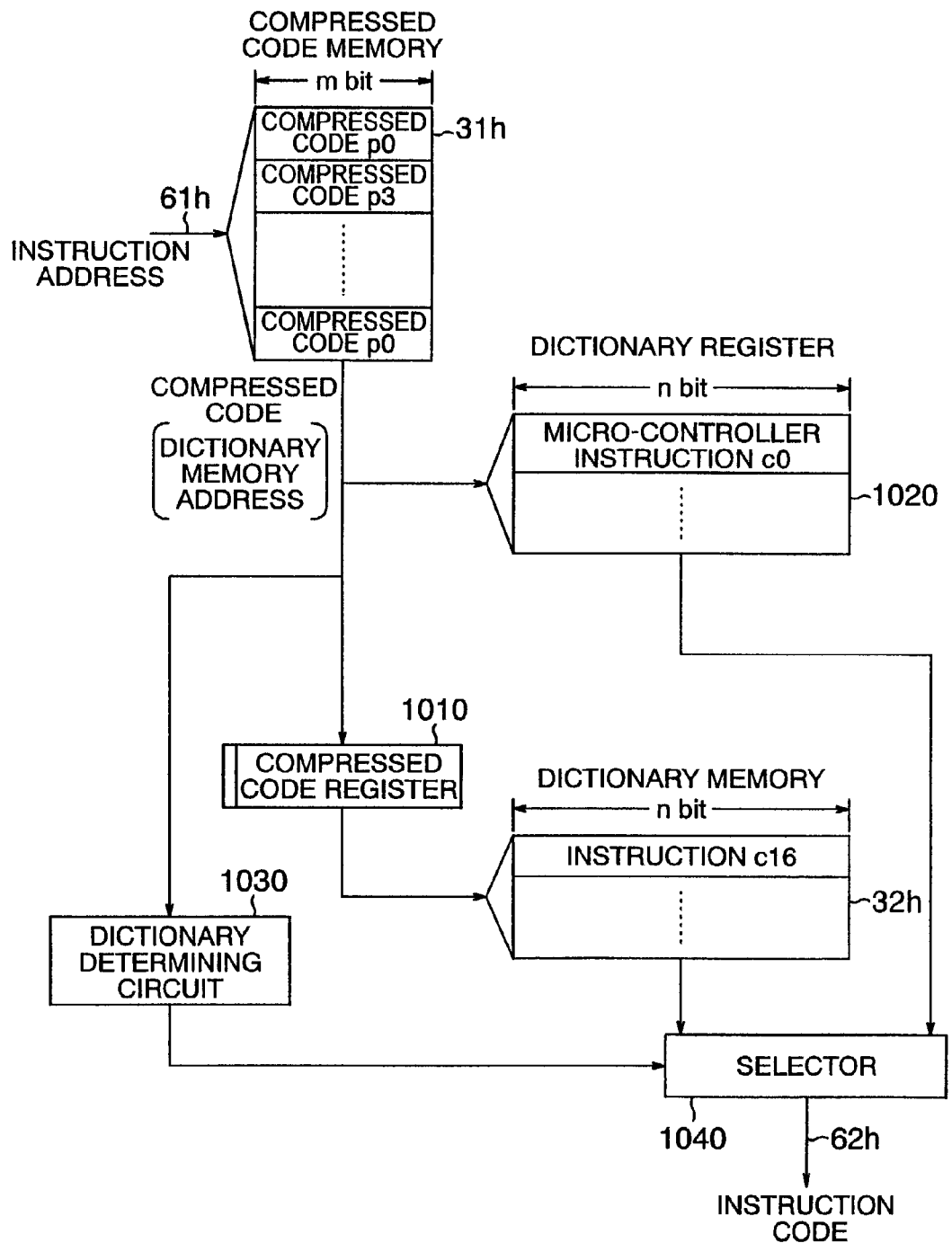
FIG. 10 is a block diagram for explaining an exemplary configuration of a program memory in a ninth embodiment.

Next, a ninth embodiment of the present invention will be described with reference to FIG. 10 which is a block diagram for explaining an exemplary configuration of a program memory 30 in the ninth embodiment.

In the ninth embodiment, a dictionary register 1020 which functions as a fast dictionary memory, a dictionary determining circuit 1030, and a selector 1040 are added to the configuration of the eighth embodiment.

The dictionary register 1020 preferably stores an instruction code which is frequently used, for example, an instruction code at a branched destination, or the like.

The dictionary determining circuit 1030 determines whether a compressed code read from a compressed code memory 31h is expanded by the dictionary register 1020 or by a dictionary memory 32h. The selector 1040 selects either the dictionary register 1020 or the dictionary memory 32h based on a determination result of the dictionary determining circuit 1030, and outputs an instruction code 62h.

By doing so, a frequently used instruction code, for example, an instruction code at a branched destination can be expanded fast by using the dictionary register 1020. Particularly, the micro-controller 10 can be prevented from degraded performance when a branch or the like occurs to cause a discontinuous instruction address 61h.

Figure 11:
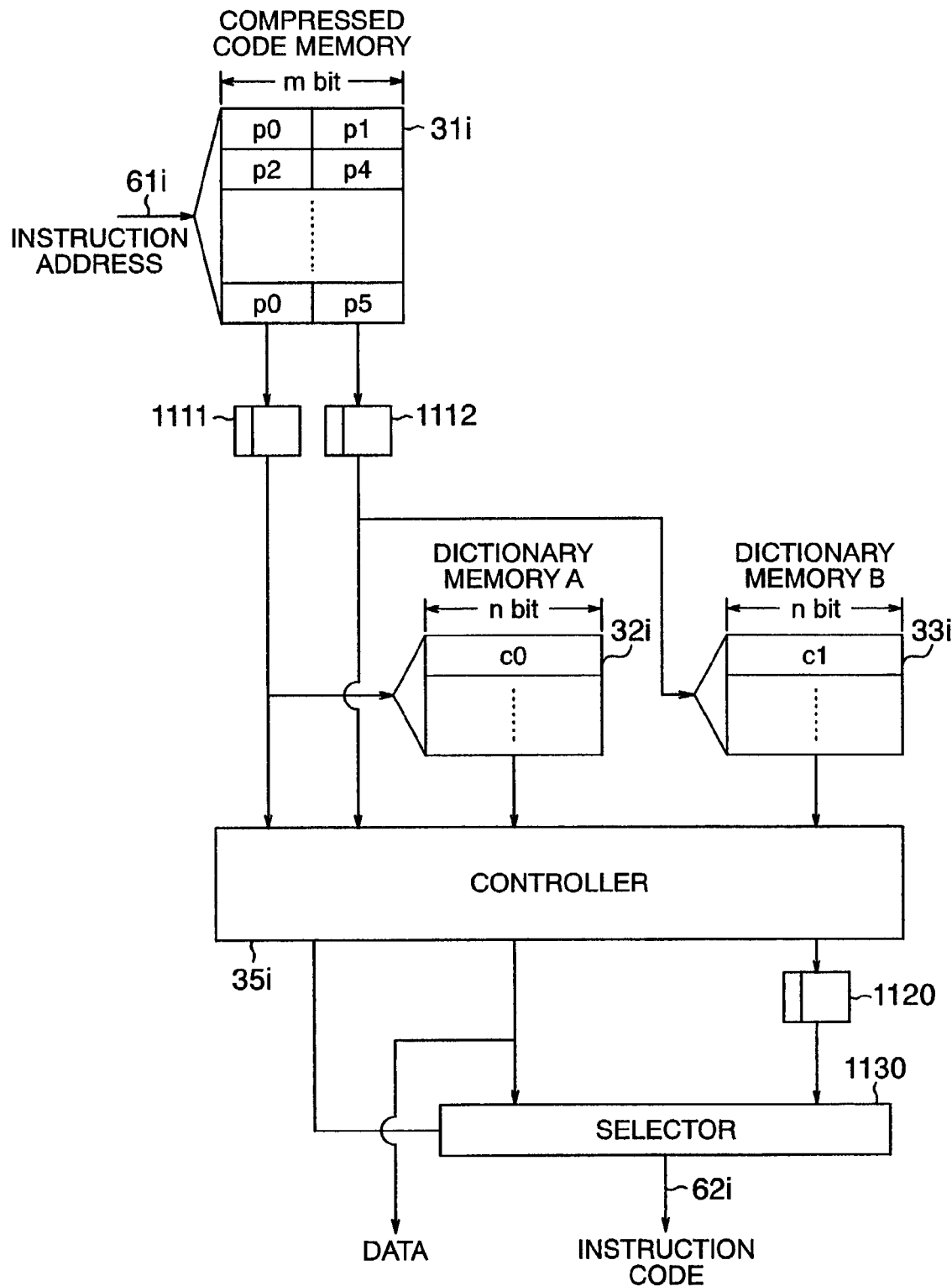
FIG. 11 is a block diagram for explaining an exemplary configuration of a program memory in a tenth embodiment.

Next, a tenth embodiment of the present invention will be explained with reference to FIG. 11 which is a block diagram for explaining an exemplary configuration of a program memory 30 in the tenth embodiment.

In the tenth embodiment, two consecutive compressed codes are read simultaneously. In this event, the compressed codes are read at every other clock. Also, a dictionary memory 32 is divided into a dictionary memory A32i and a dictionary memory B33i, by way of example. Combinations of instruction codes stored in the two dictionary memories are arbitrary. For example, instruction codes may be distributed into two by the values of the most significant bits or least significant bits. Alternatively, highly frequently used instruction codes may be stored in both dictionary memories. Further alternatively, all instruction codes may be stored in both dictionary memories.

A controller 35i stores two simultaneously read compressed codes in a register A1111 and a register B1112, respectively.

Then, when respective addresses indicated by the compressed codes stored in the register A1111 and register B1112 are stored in the two different dictionary memories, instruction codes are read simultaneously from the two dictionary memories. On the other hands, when both addresses indicted by the compressed codes belong to one of the two dictionary memories, an instruction code indicated by the register A1111 is first read, followed by reading an instruction code indicated by the register B1112 in the next cycle.

When two instruction codes are read simultaneously, an instruction code indicated by the register B1112 is stored in a register 1120, and an instruction code indicated by the register A1111 is outputted. Then, the instruction code indicated by the register B1112 is outputted. On the other hand, when two instruction codes are read in sequence, the instruction codes are outputted in the order in which they are read.

In the event that a compressed code is read once in two cycles, if instruction codes are simultaneously read from the two dictionary memories, the dictionary memories need not be accessed in the remaining one of the two cycles. This cycle can be utilized to read data from a memory, for example, thereby improving the performance of the micro-controller 10.

Figure 12:
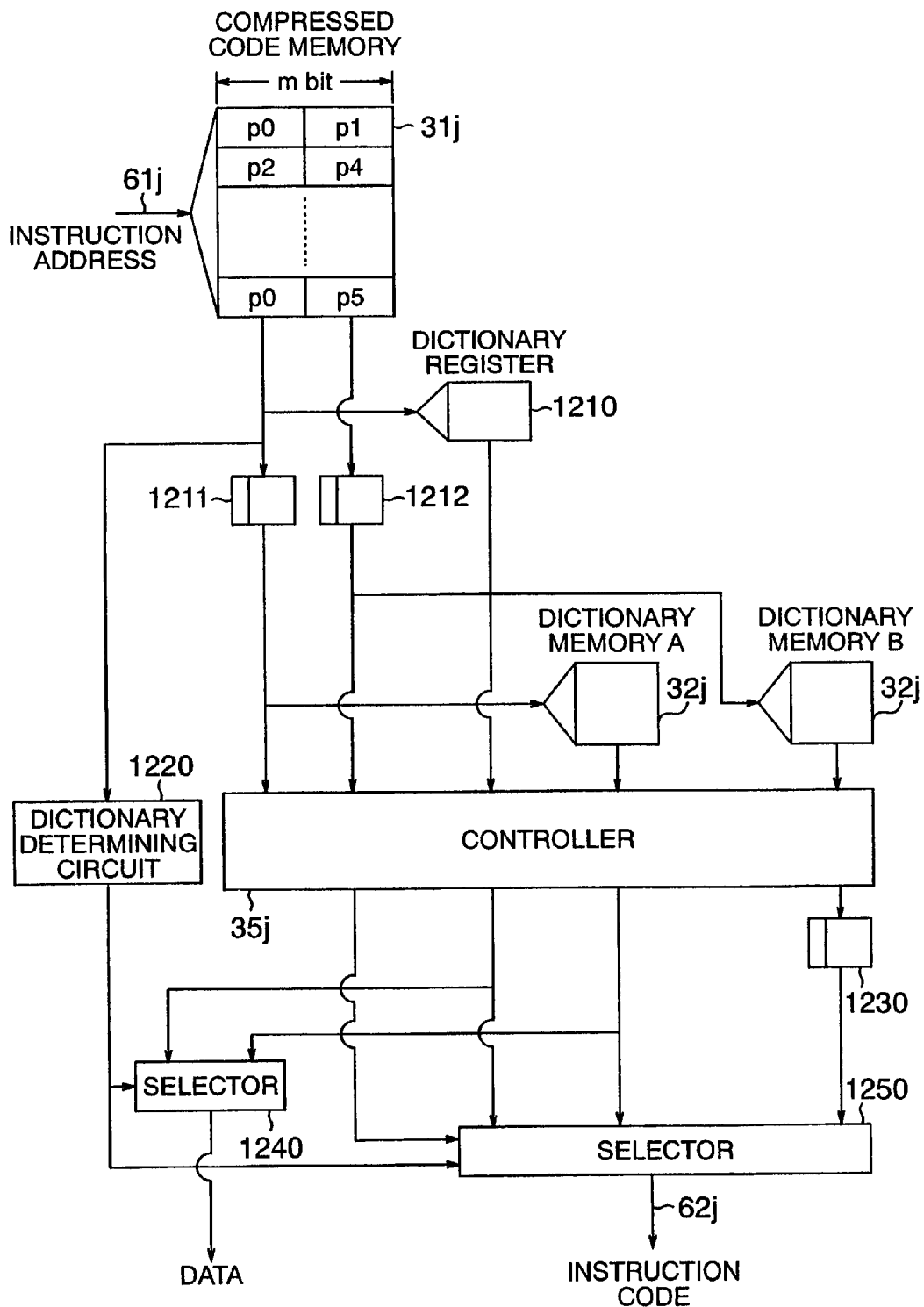
FIG. 12 is a block diagram for explaining an exemplary configuration of a program memory in an eleventh embodiment.

Next, an eleventh embodiment of the present invention will be explained with reference to FIG. 12 which is a block diagram for explaining an exemplary configuration of a program memory 30 in the eleventh embodiment.

In the eleventh embodiment, the dictionary register in the aforementioned ninth embodiment is added to the configuration of the tenth embodiment.

Like the tenth embodiment, in the eleventh embodiment, two consecutive compressed codes are read simultaneously. Then, it is determined whether or not the first compressed code can be expanded by the dictionary register 1210. If it can be expanded by the dictionary register 1210, the compressed code is expanded to an instruction code in one cycle, and the second compressed code can be expanded in the next cycle using a dictionary memory A32j or a dictionary memory B33j.

If the first compressed code cannot be expanded in the dictionary register 1210, a process similar to that in the tenth embodiment is performed to output consecutive instruction codes in order.

Figure 13:
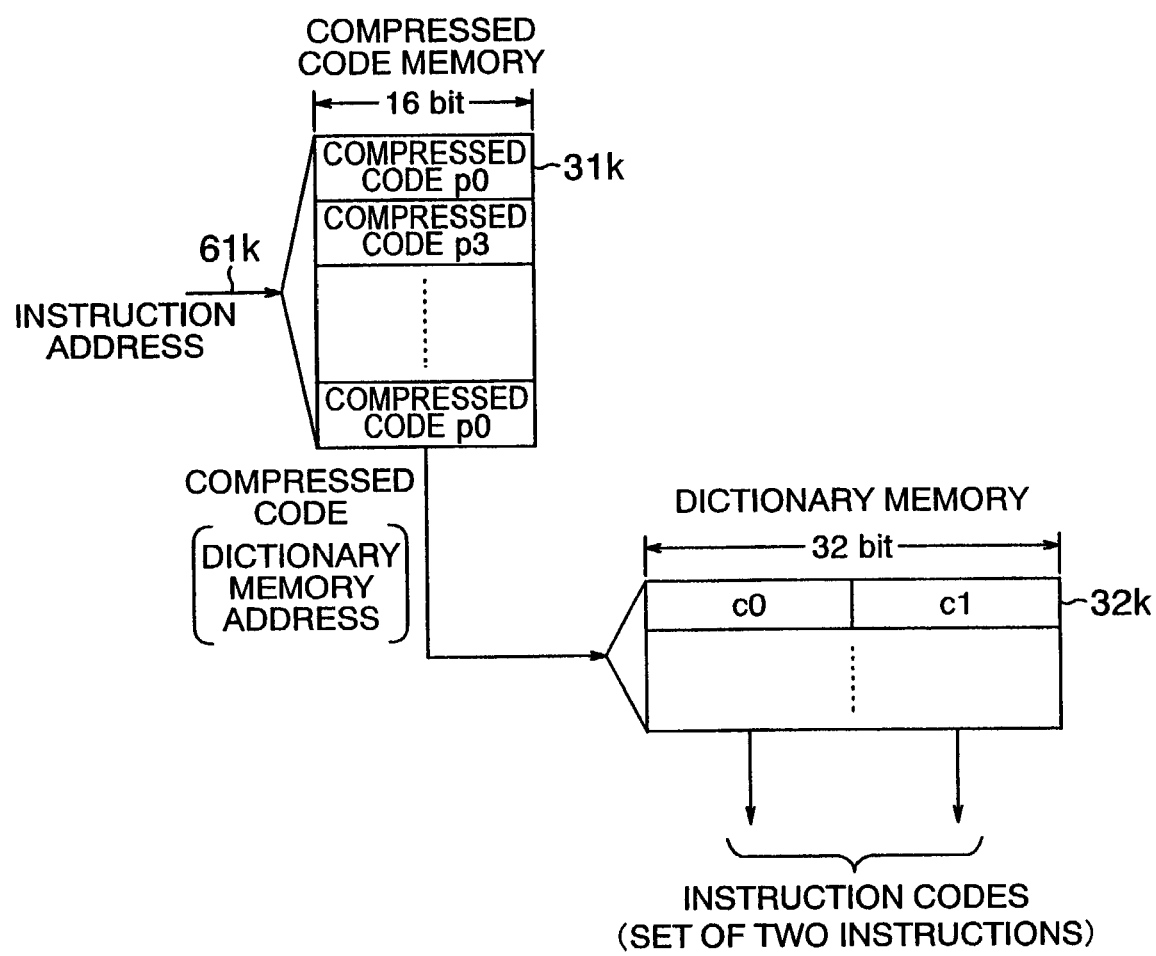
FIG. 13 is a block diagram for explaining an exemplary configuration of a program memory in a twelfth embodiment.

Next, a twelfth embodiment of the present invention will be explained with reference to FIG. 13 which is a block diagram for explaining an exemplary configuration of a program memory 30 in the twelfth embodiment.

The twelfth embodiment takes as an example an original instruction which has a code length of 16 bits. In the present invention, it is contemplated that as an original instruction code is shorter, the compression ratio is lower. For this reason, in the twelfth embodiment, two 16-bit instruction codes are grouped into a set which is converted to a single compressed code. In the example illustrated in FIG. 13, compressed codes each have a 16-bit length and are read one by one by an instruction address 61k. A read compressed code is used as an address in a dictionary memory 32k to simultaneously read 16-bit instruction codes. By doing so, a high compression ratio can be achieved even if the original instructions have a short code length.

An exemplary method of organizing a compressed code memory 31k and dictionary memory 32k in this event will be explained with reference to FIGS. 14A, 14B.

Figure 14A:
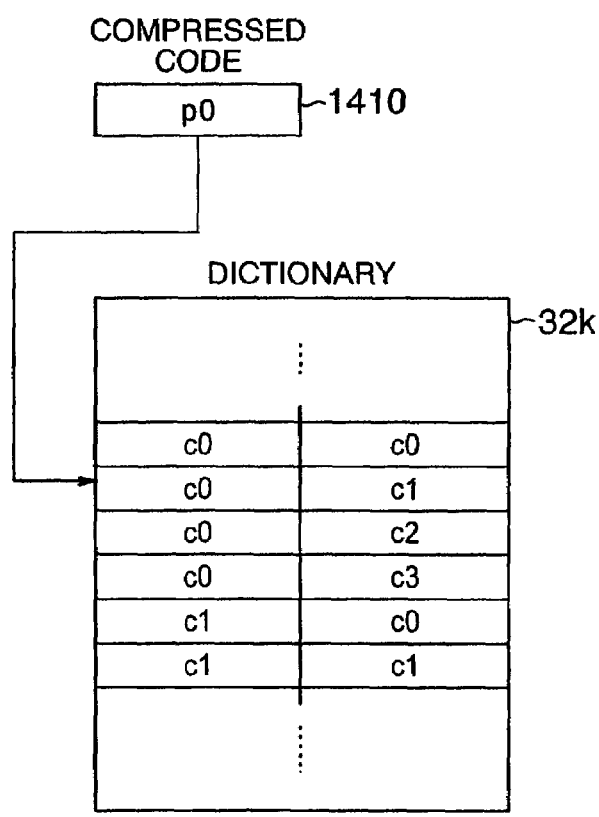
FIG. 14A is a diagram for explaining an exemplary method of organizing a compressed code memory and a dictionary memory in the twelfth embodiment.

FIG. 14A shows that a compressed code p0 indicates a combination of instruction codes c0, c1. In a dictionary memory 32j in FIG. 14A, 16-bit instruction codes are combined as "c0, c0", "c0, c1", "c0, c2", "c0, c3"...

Figure 14B:
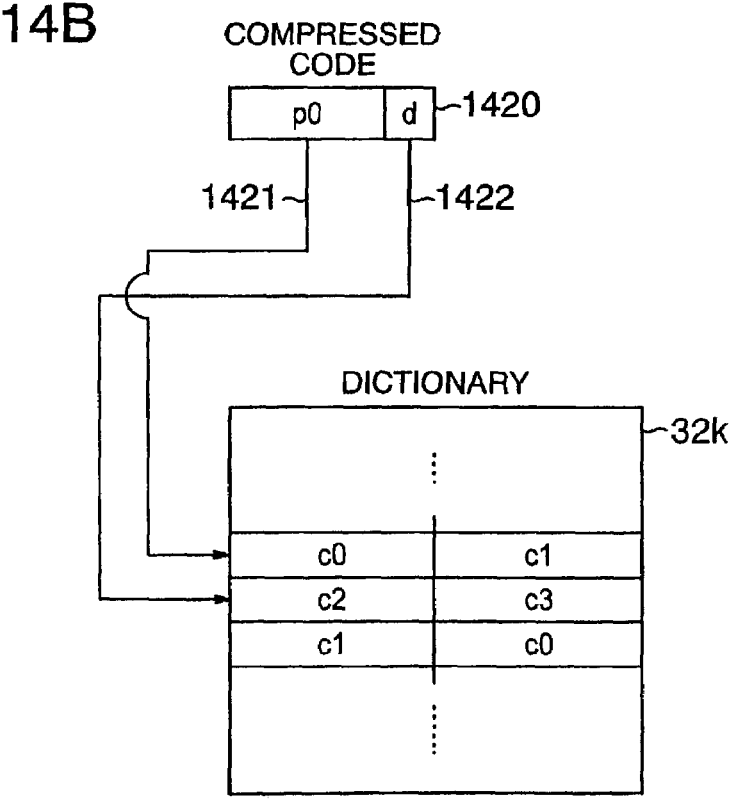
FIG. 14B is a diagram for explaining an exemplary modification to the twelfth embodiment.

With the foregoing combination, the capacity of the dictionary memory 32j can be reduced by organizing the compressed code memory 31j and dictionary memory 32j as shown in FIG. 14B.

Specifically, the dictionary memory 32k stores instruction codes in combination of "c0, c1" and "c2, c3." Then, a compressed code 1420 is divided into an address portion 1421 indicative of the first instruction code in a combination, and a difference portion 1422 (either of 0–3 in this example) indicative of the second instruction code in the combination, and the two portions are separately stored in the dictionary memory 32k. For example, when the address portion 1421 indicates "c0" and the difference portion 1422 indicates "2," this compressed code represents a combination of instruction codes "c0, c2." When the difference portion 1422 indicates "0," the compressed code indicates a combination of instruction codes "c0, c0."

The foregoing exemplary configuration can be applied as well to an instruction code which has an arbitrary bit length.

Next, a thirteenth embodiment of the present invention will be explained with reference to FIG. 15 which is a block diagram for explaining an exemplary configuration of a program memory 30 in the thirteenth embodiment.

The thirteenth embodiment illustrates an exemplary configuration when a compressed code memory 311 and a dictionary memory 321 are physically located on the same memory device 1500 so that they cannot be read simultaneously (the foregoing embodiments have been described on the assumption that the compressed code memory can be read simultaneously with the dictionary memory. However, they may be located on the same memory device).

In the thirteenth embodiment, a 16-bit compressed code p0 is read with an instruction address 611, and held in a register 1510. Then, in the next cycle after the compressed code was read, 16-bit instruction codes c0, c1, for example, are simultaneously read based on an address indicated by the compressed code held in the register 1510.

Even if the compressed code memory 311 and dictionary memory 321 are physically located on the same memory device 1500, a compressed code and an instruction code can be read simultaneously by using, for example, a two-port memory from which a plurality of data can be read in parallel.

Figure 16:
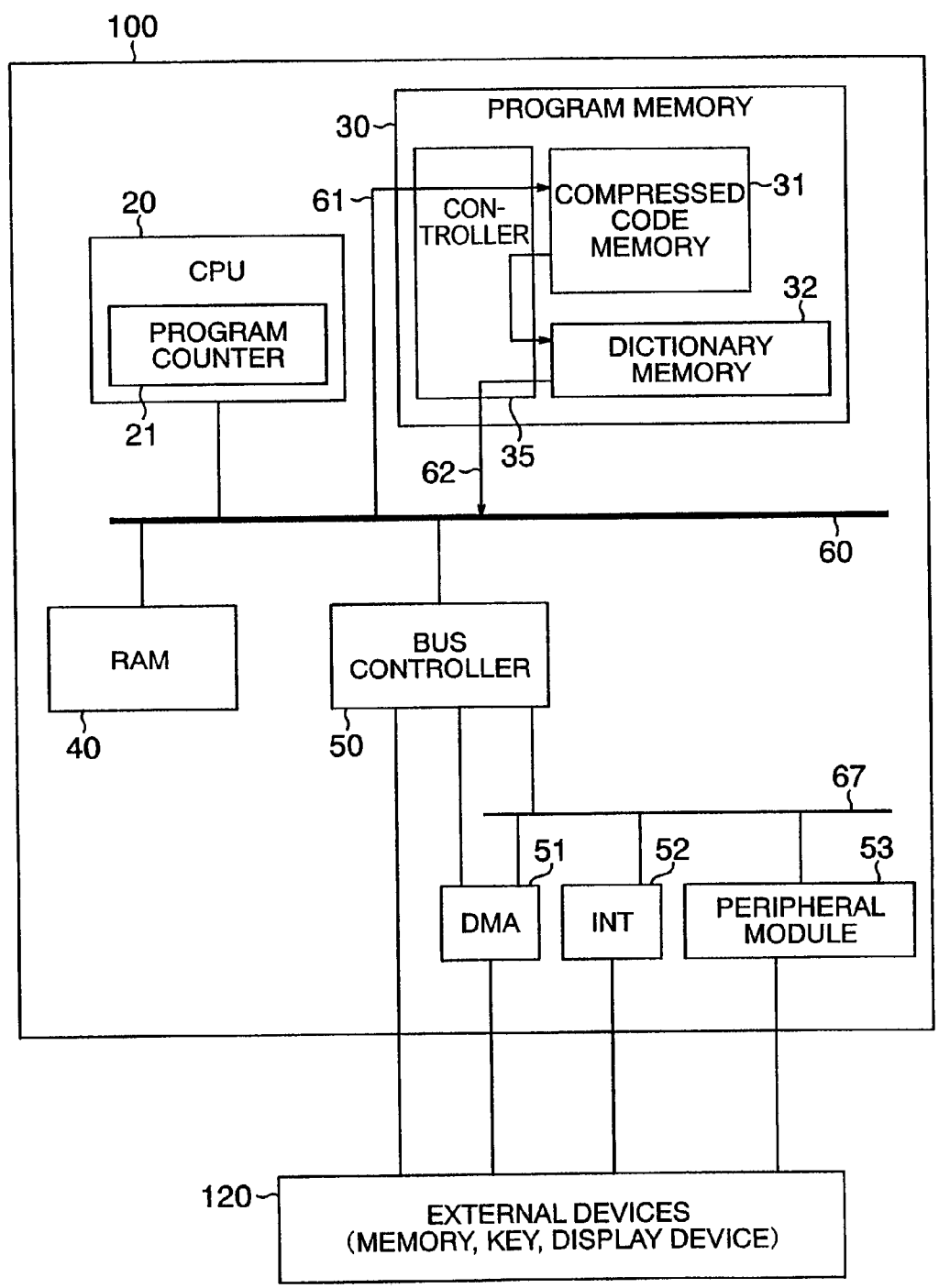
FIG. 16 is a block diagram illustrating an exemplary apparatus which utilizes a micro-controller to which the present invention is applied.

FIG. 16 is a block diagram of an apparatus which utilizes a micro-controller 100 to which the present invention is applied. In FIG. 16, the micro-controller 100 comprises a direct memory access controller (DMA) 51; an interrupt controller (INT) 52, for example, a timer; a communication interface; and a peripheral module 53 such as an A/D converter, all of which are connected to a bus controller 50.

External to the micro-controller 100, a group of external devices 120 are connected through the bus controller 50, DMA 51, INT 52, and the like. The external devices 120 may be, for example, a memory, a key, a display device, and the like depending on applications of the micro-controller 100. Such an apparatus can be applied to an ECU (Electronic Control Unit), for example, in a system built in a car.

As described above, the present invention provides the instruction code compression technique which offers a high compression ratio and fast instruction expandability.

It should be further understood by those skilled in the art that the foregoing description has been made on embodiments of the invention and that various changes and modifications may be made in the invention without departing from the spirit of the invention and the scope of the appended claims.

What is claimed is:

1. A micro-controller for performing a process in accordance with a program, comprising:

two dictionary memories for storing instruction codes which appear in the program;

a compressed code memory for storing compressed codes each converted from each of the instruction codes included in the program, each said compressed code having a word length sufficiently long to identify all instruction codes included in the program, each said compressed code having a value indicative of an address in said dictionary memory at which an associated instruction code is stored; and reading means for simultaneously reading two consecutive compressed codes every other clock and temporarily storing the two compressed codes in registers, respectively, responsive to an instruction code read request which specifies an address of a compressed code, to read two consecutive compressed codes stored in the specified address in said compressed code memory, and to store the read compressed codes in said registers, responsive to the compressed codes which respectively indicate different dictionary memories to simultaneously read instruction codes stored at addresses indicated by the respective compressed codes, and to output the instruction codes in an order of the consecutive compressed codes associated therewith, and responsive to the compressed codes which respectively indicate the same dictionary memory to read instruction codes stored at addresses indicated by the compressed codes in an order of the consecutive compressed codes, and to output the instruction codes.

2. A micro-controller for performing a process in accordance with a program, comprising:

a dictionary register for storing a predetermined particular instruction code out of instruction codes which appear in the program;

two dictionary memories for storing the instruction codes other than said particular instruction code out of the instruction codes which appear in the program;

a compressed code memory for storing compressed codes each converted from each of the instruction codes included in the program, each said compressed code having a word length sufficiently long to identify all instruction codes included in the program, each said compressed code having a value indicative of addresses in said dictionary memories at which associated instruction codes are stored or an address in said dictionary register at which one of the associated instruction codes is stored; and reading means for simultaneously reading two consecutive compressed codes every other clock and temporarily storing the two compressed codes in registers, respectively, wherein responsive to an instruction code read request which specifies an address of a compressed code, to read two consecutive compressed codes stored in the specified address in said compressed code memory, responsive to the first one of the two consecutive compressed code which indicates said dictionary register to read and output an instruction code stored at an address indicated by the first compressed code, and to subsequently read and output an instruction code stored in said dictionary memory or in a register in said dictionary register indicated by the second compressed code,
responsive to the first one of the two consecutive compressed code which does not indicate said dictionary register to determine whether or not the respective compressed codes indicate different dictionary memories,
simultaneously to read instruction codes stored at addresses indicated by the respective compressed codes, and output the instruction codes in an order of the consecutive compressed codes associated therewith, when the respective compressed codes indicate different dictionary memories, and
to read and output instruction codes stored at addresses indicated by the compressed codes in an order of the consecutive compressed codes when the respective compressed codes indicates the same dictionary memory.

3. A micro-controller according to claim 2, wherein:
said dictionary register is capable of reading an instruction code faster than said dictionary memory, and said dictionary register stores at least one instruction code at a branch destination of an instruction code which instructs a branch.

4. A micro-controller for performing a process in accordance with a program, comprising:
a dictionary memory region for storing instruction codes which appear in the program; and
a compressed code memory for storing compressed codes each converted from a set of two consecutive instruction codes included in the program, each said compressed code memory having a word length sufficiently long to identify all instruction code sets included in the program, each said compressed code having a value indicative of an address in said dictionary memory in which the associated instruction code set is stored,
responsive to an instruction code read request which specifies an address of a compressed code, to read a compressed code stored in the specified address in said compressed code memory, and to subsequently read an instruction code set stored in an address indicated by the compressed code in said dictionary memory.

5. A micro-controller for performing a process in accordance with a program, comprising:
a memory including a dictionary memory region for storing instruction codes which appear in the program, and a compressed code memory region for storing compressed codes, in a fixed length, each converted from each of the instruction codes included in the program, each said compressed code having a word length sufficiently long to identify all instruction codes included in the program, each said compressed code having a value indicative of an address in said dictionary memory at which an associated instruction code is stored; and
a compressed code register for temporarily storing a read compressed code, wherein responsive to an instruction code read request which specifies an address of a compressed code, to read a compressed code stored at the specified address in said compressed code memory region, to store the compressed code in said register, and to read an instruction code stored in an address in said dictionary memory region indicated by the compressed code stored in said register.

6. A micro-controller according to claim 5, wherein:
said memory comprises a two-port memory capable of reading in parallel, wherein said compressed code is read through a first port, and said instruction code is read from a second port.

7. A micro-controller for performing a process in accordance with a program, comprising:
a dictionary memory for storing instruction codes which appear in the program; and
a compressed code memory for storing compressed codes each converted from a set of two consecutive instruction codes included in the program, each said compressed code memory having a word length sufficiently long to identify respective first instruction codes in the instruction code sets, each said compressed code having a value comprised of a first portion indicative of an address in said dictionary memory in which the associated instruction code set is stored, and a second portion indicative of a position in said dictionary memory at which the second instruction code in said instruction code set is stored as a relative value to said address, wherein
responsive to an instruction code read request which specifies an address of a compressed code, to read a compressed code stored at the specified address in said compressed code memory, to read an instruction code stored in the address indicated by the first portion of said compressed code in said dictionary memory, and to read an instruction code identified by the second portion of said compressed code.

8. An apparatus built in a car, comprising a micro-controller including:
a dictionary memory for storing instruction codes which appear in the program; and
a compressed code memory for storing compressed codes each converted from each of the instruction codes included in the program, each said compressed code having a word length sufficiently long to identify all instruction codes included in the program, each said compressed code having a value indicative of an address in said dictionary memory at which an associated instruction code is stored, wherein
responsive to an instruction code read request which specifies an address of a compressed code, to read the compressed code stored in the specified address in said compressed code memory, and to subsequently read an instruction code stored in an address indicated by the compressed code in said dictionary memory.

* * * * *